US004001783B2

United States Statutory Invention Registration [19]

[11] Reg. Number: H1783

McLean

[45] Published: Feb. 2, 1999

[54] HIGH SPATIAL RESOLUTION, RANGE GATED, UNDERWATER IMAGING METHOD AND APPARATUS

[76] Inventor: Edgar A. McLean, 19 Mel Mara Dr., Oxon Hill, Md. 20745

[21] Appl. No.: 34,948

[22] Filed: Jan. 29, 1998

[51] Int. Cl.[6] ..... G01C 3/08; G01C 11/02

[52] U.S. Cl. ..... 356/5.04; 348/31

*Primary Examiner*—Bernarr E. Gregory

[57] ABSTRACT

A method and apparatus for imaging objects in turbid mediums, such as water, the invention using a laser pulse, a detector of the reflected laser pulse, and a shutter on the detector. The shutter is kept closed except at the expected return time of the laser pulse from the reflected object to be detected and identified at which time the shutter is opened to permit the detector to receive the reflected laser pulse. Typically, laser pulses with widths of about 100 to about 500 psecs are used. In addition, typical shutter times or gate widths of about 100 to about 500 psecs are also used. Gate widths on the order of 120 psecs are preferred. The detector or GOI camera is shielded from spurious signals, most notably, scattered laser light from the turbid medium.

11 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

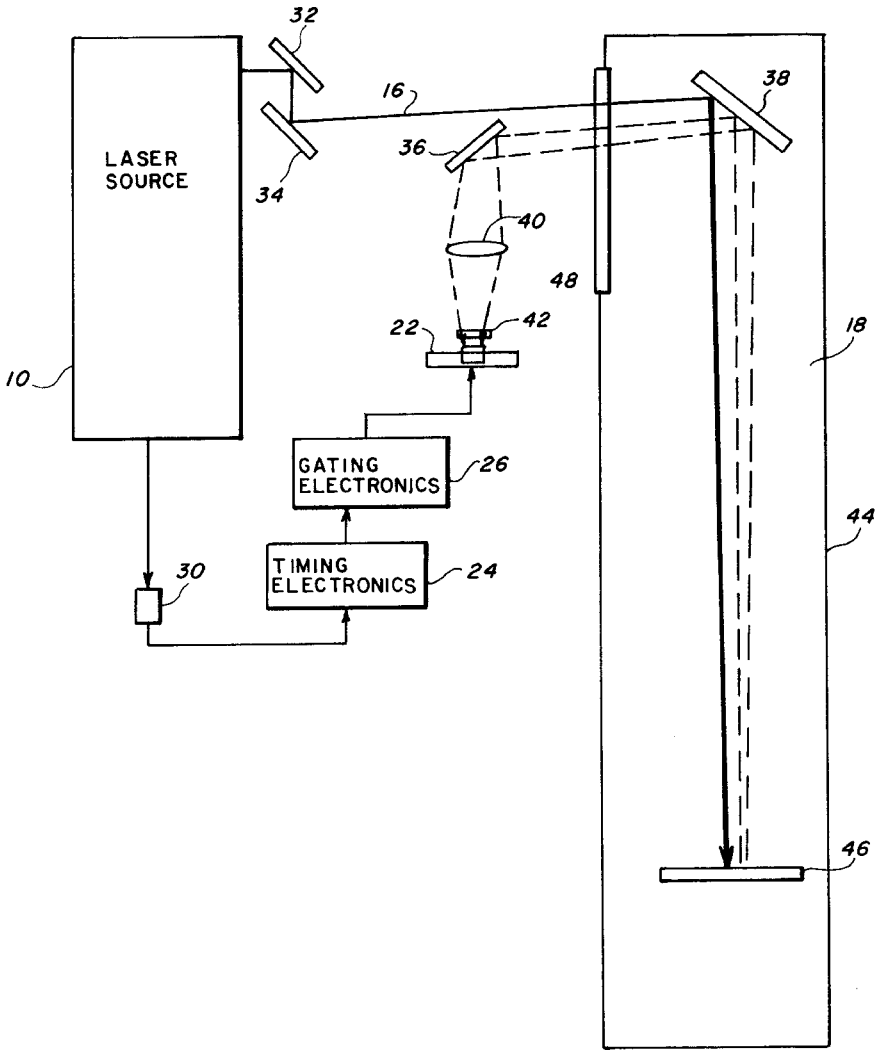

HIGH SPATIAL RESOLUTION, RANGE GATED, UNDERWATER IMAGING METHOD AND APPARATUS

BACKGROUND OF THE INVENTION

1. Field of the Invention

This invention relates to a method and apparatus for detecting and identifying a submerged object in a medium containing particulate matter causing poor visibility. More specifically, this invention relates to a high speed imaging method for detecting and identifying a submerged object in a murky or turbid medium.

2. Description of the Related Art

Generally, when light is directed at an object, the reflection of the light allows one to see the object. Suspended particulate matter, such as dust, mud (in water) and water droplets (fog), however, scatter both direct and reflected light greatly reducing visibility. If it reaches the observer, light which has been forward or backscattered distorts the image of the object. Only light that has not been either forward or backscattered and which reaches the observer forms an accurate image of the object.

One solution to eliminating the effect of forward scattered and back scattered light has been to gate an optical imager so that only a minimum of scattered light is seen. Unscattered light travels the shortest path from its source to the object and then to the observer. Thus, if one gates an optical imager to open at the precise point in time when unscattered light will arrive at the optical imager and to close after the unscattered light has arrived at the imager, then most scattered light will be prevented from obscuring the image of the object. In effect, by properly gating the optical imager, a clearer image of the object is formed. This use of a gated optical detector has been discussed in several U.S. patents. For example, see U.S. Pat. Nos. 3,682,553; 3,902,803; 4,862,257; 4,920,412; 4,967,270; and 5,013,917. Additionally, in U.S. Pat. No. 3,151,268, gate widths or exposure times of 3 nanoseconds or less are used. In U.S. Pat. No. 3,467,773, gate widths or exposure times of 20 nanoseconds are used. In U.S. Pat. No. 3,499,110, gate widths or exposure times of 10 nanoseconds are used. U.S. Pat. No. 3,527,881 suggests that the problems associated with underwater exploration are due to "backscatter," "forward scatter," and "attenuation." See column 2, lines 27, 44 and 51, respectively. U.S. Pat. No. 3,856,988 provides for an imaging system for environments where light scattering reduces image quality.

Turbid water inherently backscatters light. In underwater exploration systems, the intrinsic absorption and scattering properties of the water limit the usefulness of prior art systems. In addition to using short exposures or gate widths, the use of short pulsed sources of light also reduces the amount of scattered light entering a gated optical imager while it is gated open. In water, the source of illumination is generally a green or bluegreen laser. If the illuminating source is "on" continuously, there is a constant amount of scattered light present in the medium. In such an environment, where there is an abundance of scattered light present, the use of a gated optical imager GOI is defeated because the amount of scattered light entering the GOI cannot be greatly reduced. The effect of using a continuous source of light rather than a pulsed source is to introduce into the system an increased level of background noise or background scatter that will necessarily enter the GOI whenever it is gated open irrespective of the duration of the gate width. This scattered light, or backscatter, reduces the contrast between objects in the scene. Thus, underwater imaging systems most often operate in a pulse gated mode. This method of operation has been referred to as a range-gating technique.

It is suggested that the shorter the pulse width of the light source and the shorter the gate width of the gated optical detector, the better the clarity of the image obtained using a range-gating technique. However, given a short pulse width and a short gate width, little else has been done to improve the image quality of photographs of an object submerged in a turbid medium such as water. There is a need for a method for improving the image quality of an object in a turbid medium other than by just reducing the pulse width and the gate width.

SUMMARY OF THE INVENTION

It is therefore an object of the present invention to obtain an image of an object in a turbid medium with better resolution and contrast clarity than heretofore possible.

It is another object of the present invention to obtain an image of an object in a turbid medium at a greater depth or distance with better resolution and contrast clarity than heretofore possible.

These and other objects are accomplished by using a range-gating technique wherein the gate width used is shorter than heretofore used and by timing the gate width to open during the rise portion and/or the peak portion of the reflected laser pulse from the object to be imaged.

These and other objects and advantages of the invention may be readily ascertained by referring to the following detailed description and examples of the preferred embodiments.

BRIEF DESCRIPTION OF THE DRAWINGS

A more complete appreciation of the present invention and several of the accompanying advantages thereof will be readily obtained by reference to the following detailed description when considered in conjunction with the accompanying drawings, wherein.

DETAILED DESCRIPTION OF THE PREFERRED EMBODIMENTS

The following detailed description of the preferred embodiment is provided to aid those skilled in the art in practicing the present invention. However, the following detailed description of the preferred embodiment should not be construed to unduly limit the present invention. Variations and modifications in the embodiments discussed may be made by those of ordinary skDll in the art without departing from the scope of the present inventive discovery.

In range-gating, a very short, laser pulse illuminates the object, and the camera shutter is time delayed and only opens for a very short period of time when the reflected light returns from the object. The idea is to select the unscattered, reflected light from the object that arrives at the camera, blocking out the scattered photons, which follow a shorter or longer path, and which blur the image and reduce the image contrast. The GOI camera only views a layer of the medium, such as water, the thickness of which corresponds to the GOI camera gate width. In other words, the thickness of the layer viewed is equal to the speed of the reflected laser pulse in the medium containing the object, such as turbid water, multiplied by the gate width, or the time the GOI camera shutter is kept open. Range-gated imaging has been known but the improvement here is to shorten both the laser pulse width and the gate width and to time the gate width to open and close within a time period corresponding to the rise portion and/or peak portion of the reflected light pulse, for example, time regions b and c as shown in FIG. 3*b*.

Figure 1:
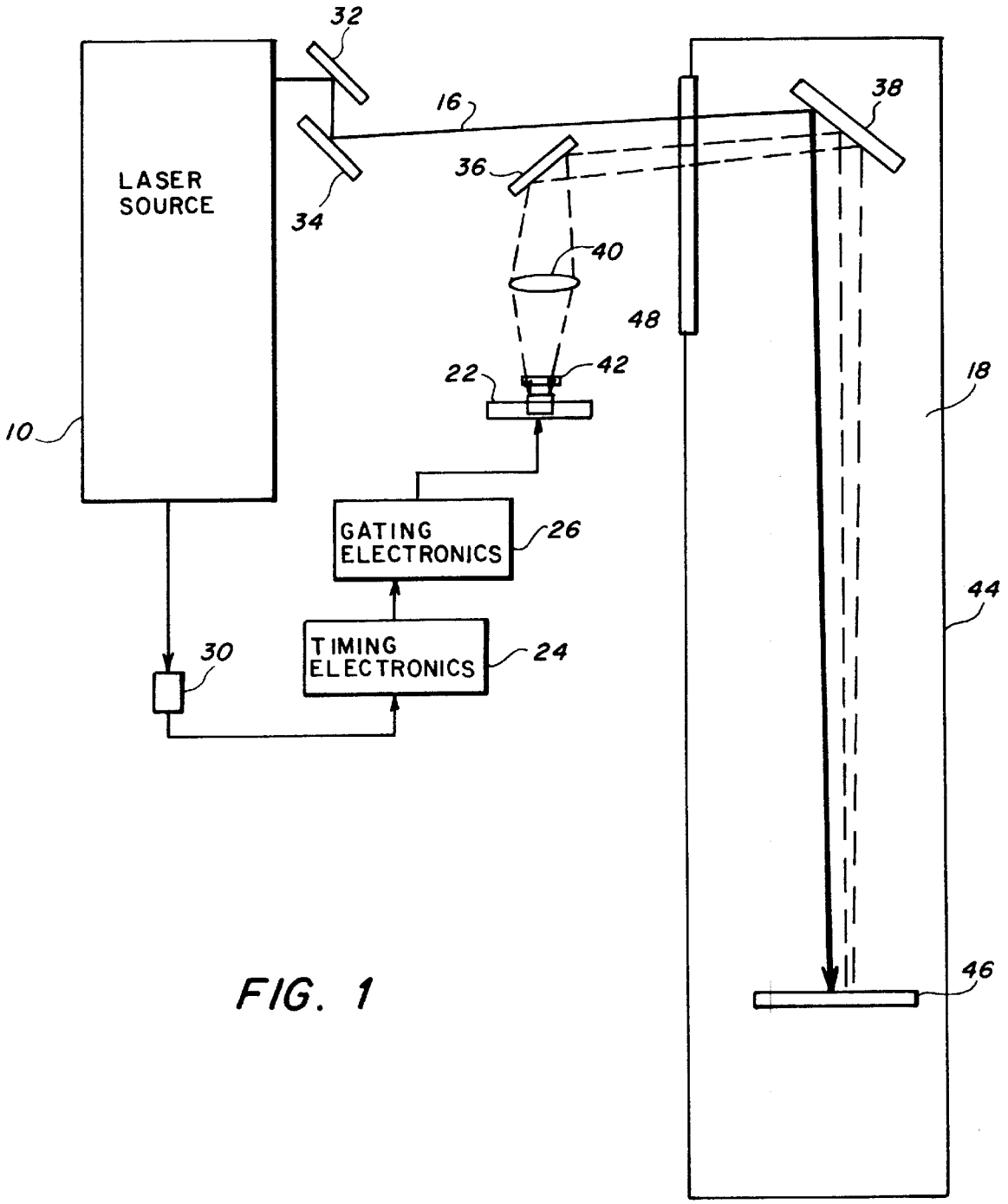
FIG. 1 is a diagrammatic view of a system according to the present invention.
Figure 2:
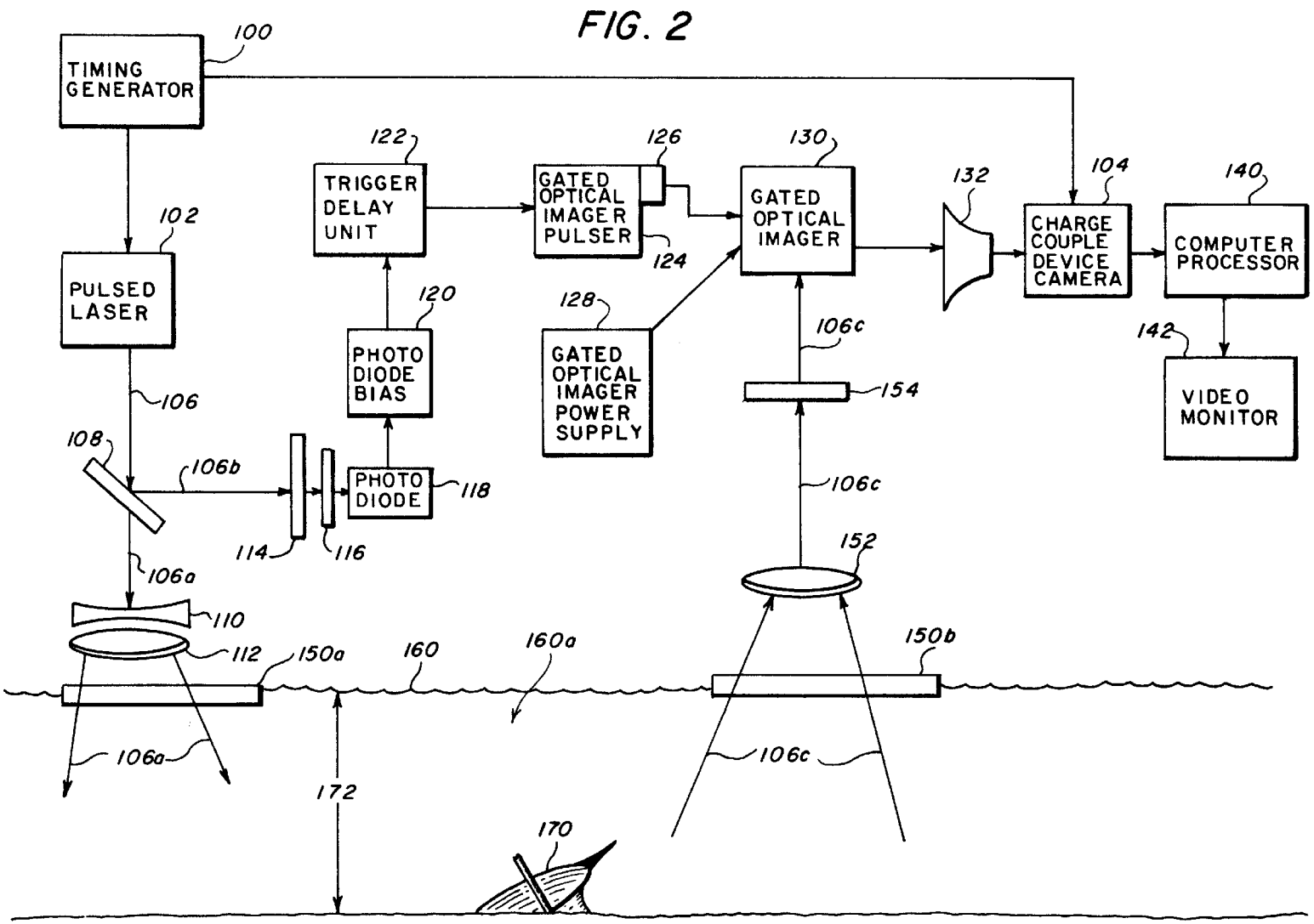
FIG. 2 is another diagrammatic view of another system according to the present invention.
Figure 3A:
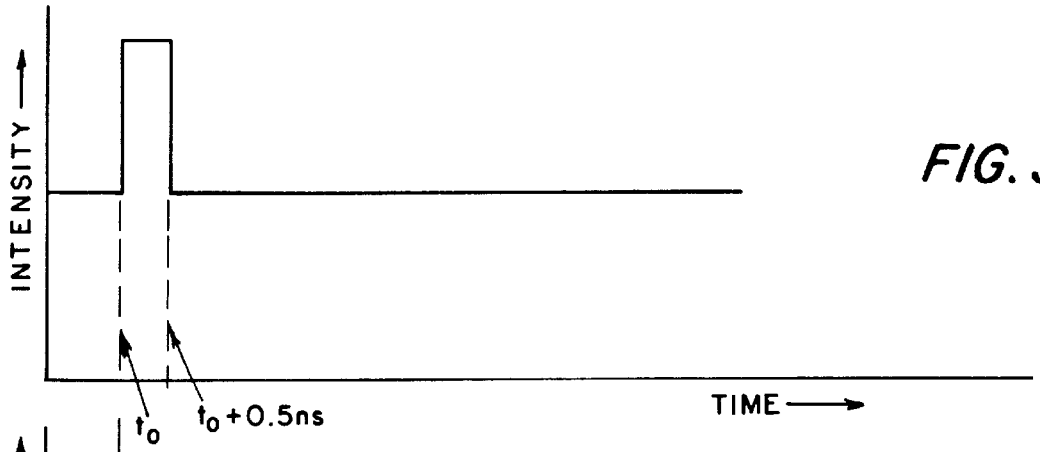
FIG. 3 made up of FIGS. 3*a*, 3*b*, and 3*c* is a timing diagram showing the time relationship of a single pulse during the operation of the system of FIG. 1.
Figure 3B:
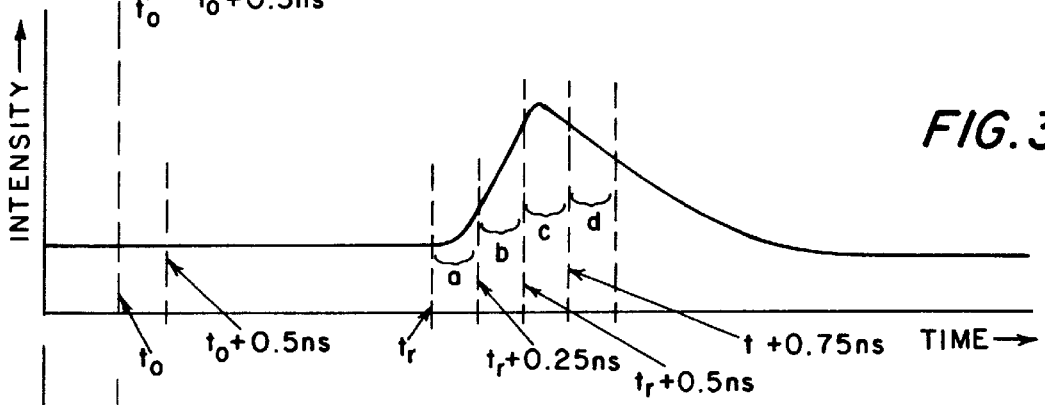
Figure 3C:
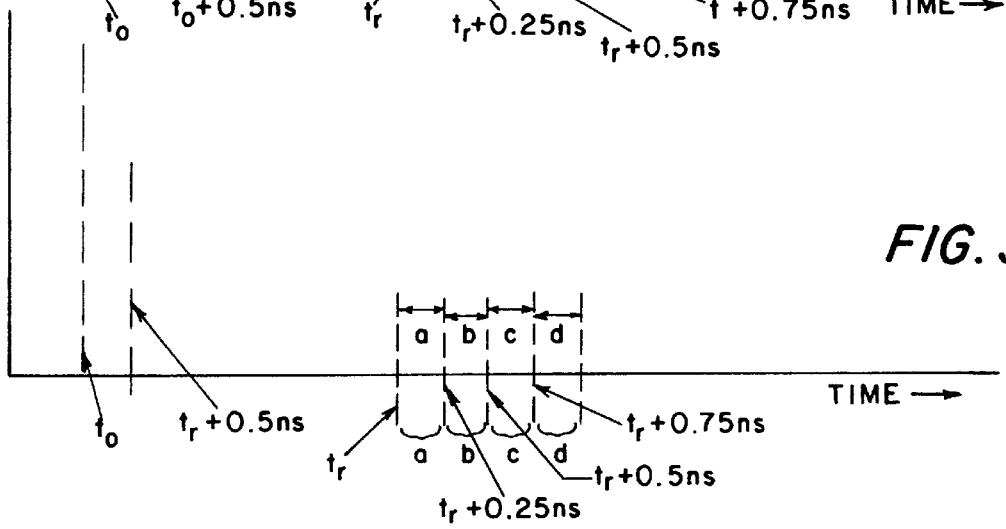
Figure 4:
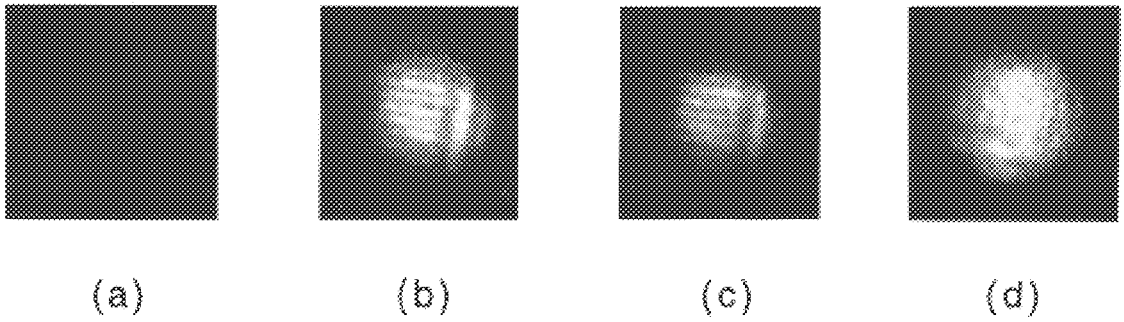
FIG. 4 contains photographs taken according to the present invention depicted in FIG. 1 and corresponding to time regions a, b, c and d marked in FIG. 3.

Referring to FIG. 3, a diagrammatic view of the time relationship of a single laser pulse during operation of the system of FIG. 1 is shown wherein FIG. 3*a* is a time versus intensity plot of an exemplary laser pulse emitted by a pulsed laser source. According to FIG. 3*a,* a laser pulse is emitted at time to and has a duration between about 100 to about 500 picoseconds (psec). Typically, a pulse width of 300 to 500 picoseconds is used. Particularly in FIG. 3*a,* an exemplary pulse width of about 500 picoseconds (0.5 nanoseconds) is depicted. This pulse corresponds to laser beam pulses 16 and 106 in FIGS. 1 and 2, respectively. FIG. 3*b* is a time versus intensity plot of an exemplary laser pulse that has been reflected by objects 46 and 170 in FIGS. 1 and 2, respectively. Time regions a, b, c and d of FIG. 3*b* correspond to a time period of about 100 to about 500 picoseconds, respectively. In FIG. 3*b,* the time regions a, b, c and d correspond to an exemplary time period of about 250 picoseconds, respectively. Gatewidths a, b, c and d are all of equal duration. Typically, gate widths range from about 100 to about 500 picoseconds, preferably from about 100 to about 300 picoseconds, more preferably from about 100 to about 150 picoseconds and most preferably from about 100 to about 125 picoseconds. In addition, each of the time periods a, b, c and d in the exemplary plot of FIG. 3*b* begin at a time about $t_r$, about $t_r$, +0.25 nanoseconds (nsec or ns), about $t_r$ +0.50 nanoseconds and about $t_r$ +0.75 nanoseconds, respectively. During time regions or gate widths a, b, c and d the gated optical imager camera has its shutter in the open position. The resolution photographs of target 46, depicted in FIGS. 1 and 6, taken during time regions a, b, c and d (see FIG. 3) are depicted in FIG. 4.

Figure 6:
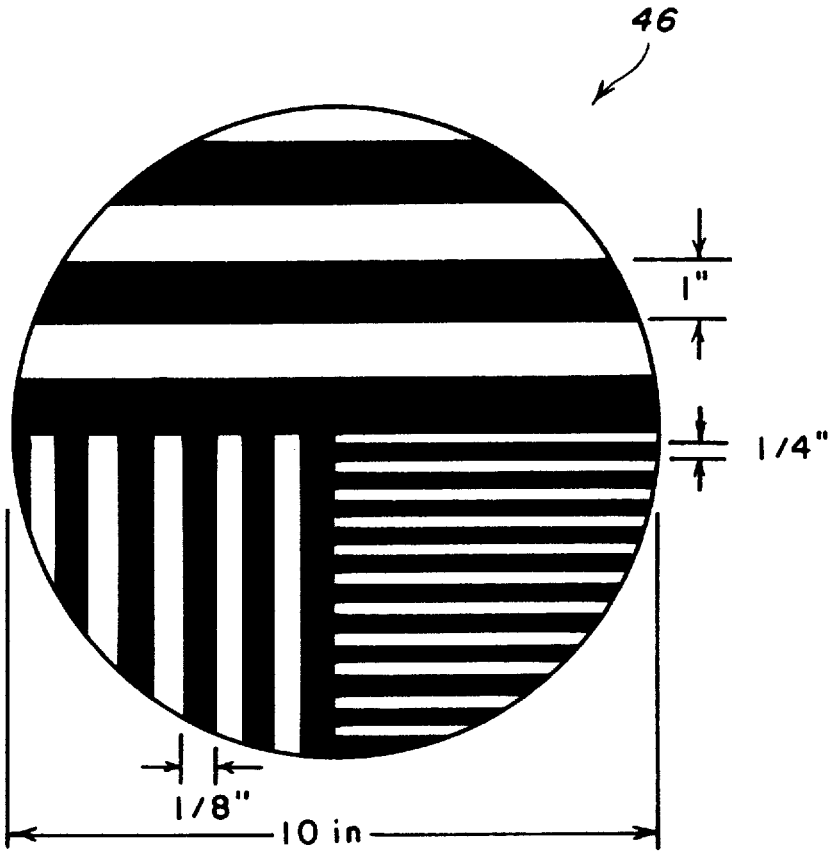
FIG. 6 contains the dimensions of the target 46 used in FIG. 1 and images of which are depicted in FIGS. 4 and 5.

The principle idea underlying the present invention is to use a gate width selected to open the GOI camera shutter during time regions on the rise portion and/or the peak portion of the reflected pulse traveling from the object to the GOI camera. The rise portion of the reflected pulse corresponds to the portion of the curve shown in FIG. 3*b* where the curve has a positive slope. The peak portion of the reflected pulse corresponds to the portion of the curve shown in FIG. 3*b* where the slope of the curve is either zero or non-existent at maximum intensity and about ±200 psec or less on either side of the maximum intensity of the reflected pulse. It is apparent from FIG. 4 that even though the gate widths of time regions a, b, c and d were of equal duration, the resolution seen in the photographs (see FIGS. 4) of the target 46, as depicted in FIGS. 1 and 6, has varying degrees of clarity. Time region a yielded no image at all because the integrated intensity of the reflected pulse was below a detectable level. See FIG. 4*a*. Time regions b and c yielded better results than time region d. See FIGS. 4*b,* 4*c* and 4*d*, respectively. Though not previously apparent, time regions b and c yielded surprisingly better results than region d. It was expected that so long as the gate width was the same, little difference would have been visible in the resolution seen on a photograph taken during time regions a, b, c and d.

Referring to FIG. 1, the present inventive method relates to a pulse-gating technique wherein a laser source 10 emitting a laser beam pulse 16 suitable for use in turbid water 18 is used in conjunction with a gated optical imager 22, timing electronics 24, gating electronics 26, photodiode 30, mirrors 32, 34, 36 and 38, imaging lens 40, narrowband filter 42, water tank 44, and target 46.

EXAMPLE 1

Figure 5:
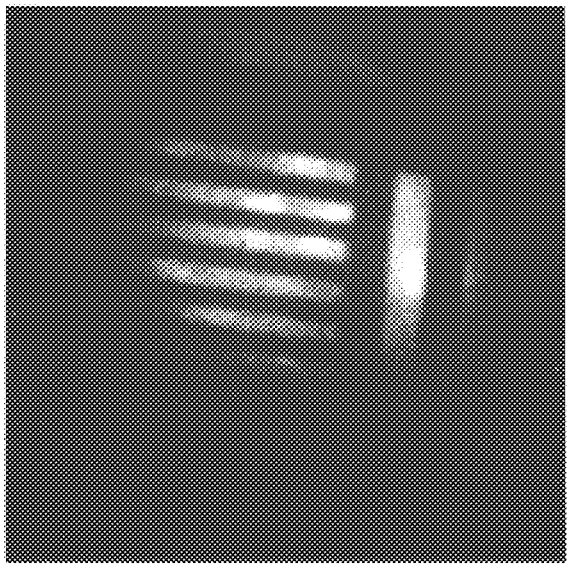
FIG. 5 contains another image taken, according to the present invention corresponding to a gate width of 120 picoseconds during the peak portion of the reflected laser pulse, using a gated optical imager GOI and a charge coupled camera (CCD). The pulse width of the source laser beam pulse was 500 picoseconds at an energy of 60 millijoules (mJ). The target distance was ~15 feet from the window via the reflecting mirror located in the turbid water tank, similar to the tank used in FIG. 1. The attenuation length of the turbid water was 3.4.

The laser source 10 used in the present invention and depicted in FIG. 1 was a Nd:YAG laser with a triple-pass ring amplifier. The amplifier had a small signal gain in excess of $8\times10^3$ and was used in conjunction with a low power, Q-switched, actively mode-locked oscillator and an electro-optic switch-out system to amplify single 60–400 mJ pulses of 500 psec duration in an approximately 2 times diffraction limited pulse. This pulse was then frequency doubled in a KD*P type II crystal with 42% net energy conversion efficiency. The output pulse was synchronized to an external master trigger with a jitter of +/−6 nsec. Additional details of the laser source 10 used are given in Jackel, S. and Burris, R., *Multiple-Pass Ring Amplifier for Feedback-Free Amplification of Short Pulses with High Gain and Energy Extraction Efficiency*, OSA Proceedings on Advanced Solid-State Lasers, (Chase & Pinto, Eds., 1992) Vol. 13, 104–108, incorporated herein by reference. Additionally, the frequency doubled Nd:YAG laser had an exemplary pulse width of about 0.5 nsec at an exemplary wavelength of about 532 nanometers (nm), which is approximately the wavelength selected for maximum transmission in coastal waters. Wavelengths for different mediums, other than coastal water, may vary. The mode-locked Nd:YAG laser frequency-doubled to give a wavelength of 532 nm was designed to give an output pulse energy of up to 160 mJ and a pulse duration of ~500 psec. For the GOI photographs and CCD images (see FIGS. 4 and 5, respectively) of the target 46, depicted in FIGS. 1 and 6, a pulse energy of 60 mJ was used to avoid stressing the laser. The laser output beam 16 was ~0.5 cm in diameter and highly collimated; thus, to illuminate a large area, it was necessary to increase the beam divergence using a combination of negative and positive lenses (not shown in FIG. 1). The lenses were arranged to produce a laser spot of about 1 foot in diameter at the target 46, which was at a distance of about 15 feet in water.

A beam splitter (not shown in FIG. 1) at the output end of the laser diverted a very small amount of energy from each laser pulse to send to the photodiode 30 a very low jitter timing pulse for the timing electronics 24. A pulse was then sent to a delay box (not shown in FIG. 1), for suitable delay, and then to the gating electronics 26 to gate open the GOI camera 22 at the time the reflected laser pulse arrived at the GOI camera 22 from the target 46. The GOI camera 22 utilized a standard 18-mm microchannelplate (MCP) wafer intensifier, gated by the application of a short gate pulse to the cathode with respect to the MCP input. The gate pulse was applied via a capacitive coupling scheme which overcame finite cathode resistivity and large capacitive loading. This scheme resulted in the removal of irising and allowed the GOI camera 22 to be gated with gate widths from about 100 psec to about 5 nsec.

The GOI camera 22 used was a Grant Applied Physics, Inc., Gated Optical Imager (GOI) which gave a single frame with a minimum exposure time of about 120 psec full width half maximum (FWEM) over a full 18-mm diameter cathode aperture. The super-fast gating speeds were obtained with a solid-state electronic pulser with a jitter of less than 50 psec and a trigger delay of ~14 nsec. The resolution was typically 10 line pairs per millimeter. A Polaroid back was part of the GOI camera 22, and Polaroid Type 612 (ASA 20000) film was used. Additional details of the camera used are given by E.A. Mclean et al., in *Nanosecond Framing Photography for Laser-Produced Interstreaming Plasmas*, SPIE VOL. 981 HIGH SPEED PHOTOGRAPHY, VIDEOGRAPHY, AND PHOTONICS VI (1988) at 186–192, incorporated herein by reference.

The target 46 was located in the large water tank 44. The large water tank 44 had the dimensions of 75'×6'×4' in which the water was made turbid by the addition of Maalox (aluminum hydroxide and magnesium hydroxide) to simulate turbid coastal waters. With the target 46 about 15 feet from the window 48, the water in tank 44 had an attenuation length of about 6.4. Uniformity of the Maalox was maintained by circulating the water while image data was collected by the GOI camera 22.

The target used is depicted in FIG. 6. As depicted in FIG. 6, a flat disk resolution chart with alternate white and black stripes painted on it was used. The width of the stripes varied from ¼" to 1" and the disk was 10 inches in diameter. The arrangement of the stripes is depicted in FIG. 6.

The photodiode 30 used was a Fairchild FND-100. The timing generator was run on a single pulse basis, and the gating electronics allowed a gate width of about 100 psec to about 500 psec, as required. In particular, a gate width of 250 psec was used for the images captured on Polaroid Type 612 (ASA 20000) film seen in FIG. 4 and a gate width of 120 psec was used for the image captured via a CCD camera on a video monitor depicted in FIG. 5.

The laser pulse 16 at 532 nm emitted by the laser source 10 was reflected by mirrors 32, 34 and 38 to direct the laser pulse 16 at target 46. The water tank was completely filled with turbid water and had a distance of about 13 feet from mirror 38 to the target 46. The reflected laser pulse from target 46 was again reflected by mirror 38 back out through Plexiglass window 48 to mirror 36 which in turn reflected the pulse through imaging lens 40 and narrow band filter 42 to the GOI camera 22. The imaging lens 40 used was a F/6 lens about 5 cm in diameter. The narrow band filter 42 had a narrow bandwidth of about 2 nm which was used as an interference filter which peaked at 532 nm. This narrow band filter 42 effectively eliminated much of the scattered sunlight which is present during daytime operation. The gate width was about 250 psec and the times used for the photographic images taken and depicted in FIGS. 4*a*, 4*b*, 4*c* and 4*d* were 0 nsec, 0.25 nsec, 0.50 nsec and 0.75 nsec, respectively, after $t_r$.

The following example relates to a proposed system for implementing the present invention.

EXAMPLE 2

Referring to FIG. 2, connect timing generator 100, to both a pulsed laser 102, and a charge couple device camera (CCD camera) 104. Operate the timing generator 100 between about 10–20 Hz. Generate a trigger pulse from the timing generator 100 and generate a laser pulse 106 from the Nd:YAG laser 102. Double the frequency of the laser pulse from laser 102 so that laser pulse 106 operates at about 532 nm for use in a water medium and has a pulse width of about 500 psec or less. Direct the laser pulse 106 towards beamsplitter 108 wherein part of the laser beam pulse 106*a* is diverted towards beam expanding lenses 110 and 112 and a smaller part of the laser beam pulse 106*b*) is directed towards an attenuating filter 116 and a diffuser 114. The beamsplitter 108 is a standard glass microscope slide oriented at an angle sufficient to split the laser pulse 106 into 106*a* and 106*b* as depicted in FIG. 2. Pass the laser beam 106*b* through the attenuating filter 116 and diffuser 114, such that the beam 106*b* encounters photodiode 118. A suitable attenuating filter 116 is a Kodak Wratten Neutral Density filter such as the "6.0 ND" filter which is properly calibrated for use at 532 nm. The diffuser 114 is a 2π radian diffuser.

Direct the output of photodiode 118 to a photodiode bias supply 120 the output of which is directed to a trigger delay unit 122. The photodiode bias supply 120 is a 9 volt bias box. Direct the output of the trigger delay unit 122 to the GOI pulser 124 which has an attached speed-up module 126. For example, a suitable trigger delay unit 122 is manufactured by Hamamatsu Inc., Model C 1097. Additional details of a suitable GOI pulser are given by EA. Mclean et al., in *Nanosecond Framing Photography for Laser-Produced Interstreaming Plasmas*, SPIE VOL. 981 HIGH SPEED PHOTOGRAPHY, VIDEOGRAPHY, AND PHOTONICS VI (1988) at 186–192, incorporated herein by reference.

Direct the output from the GOI pulser 124 to the GOI (gated optical imager) 130 which has the GOI power supply 128 connected to the GOI 130. A suitable GOI power supply 128, the GOI pulser 124, the speed up module 126 and the GOI 130 are all manufactured by Grant Applied Physics Inc., Model GOI/18.

Optically couple the GOI 130 to a charge coupled device (CCD) camera 104 via a fiber optics taper 132. Channel the image collected at the GOI 130 to the CCD camera 104 through a fiber optics taper 132. A suitable fiber optic taper 132 is manufactured by Galileo Electro-Optics Corp. which has a coupling efficiency of ~50% for a 2:1 fiber optics taper. Use the fiber optic taper 132 to reduce the exemplary 18 mm output of the GOI camera 130 to facilitate input to the smaller input of the CCD camera 104. Direct the output of the CCD camera 104 to a computer processor 140 which is connected to a video monitor 142. For example, a suitable CCD camera 104 is manufactured by Photometrics Ltd., Model CH 250, Star 1 having 384×576 pixels, 12 bit resolution and a dynamic range of 4096. In addition, an exemplary computer such as a COMPAQ CTS Model No. 2424 CTSCMP1 and an exemplary video monitor such as Dell Model VC2 are suitable for use in the proposed system of FIG. 2.

As mentioned earlier, pass laser beam pulse 106*a* through the beam expanding lenses 110 and 112 and then through an exemplary Plexiglass window 150*a* located at the bottom of, for example, a boat where the window is in direct contact with the surface of the turbid water 160. A suitable exemplary beam expanding lens 110 is a negative lens with an exemplary focal length of about 25 cm and a suitable exemplary beam expanding lens 112 is a positive lens with an exemplary focal length of about 25 cm. Using the beam expanding lenses 110 and 112, pass laser beam 106*a* through window 150*a* into the turbid water medium 160.

Pass laser beam pulse 106*a* through the water 160*a* towards the object 170 located at a depth 172 from the surface of the turbid water 160. The laser beam pulse 106*a* impinges on the object 170 and is reflected back towards the surface of the water 160 as reflected laser beam pulse 106*c*. Reflected laser beam pulse 106*c* passes from the object 170 towards the surface of the water 160. Pass laser beam pulse 106*c* back through another exemplary Plexiglass window 150*b* in contact with the surface of the water 160.

Pass laser beam pulse 106*c* through window 15O*b,* imaging lens 152 and band pass filters 154. Gate the GOI 130 open when unscattered reflected laser beam pulse 106*c* reaches the GOI 130 and thereby creates an image of object 170. Gate the GOI 130 closed after the reflected beam 106*c* is captured by the GOI 130 to minimize forward and back scattered light from entering the GOI 130 and distorting the image of the object 170.

What is claimed is:

1. A method of detecting and imaging an object in a turbid medium which is at least partially transmitting to light comprising the steps of:

illuminating said object with a pulse of laser light having a pulse width of about 100 picoseconds to about 500 picoseconds whereby said object reflects said pulse of laser light, said reflected pulse having a rise portion, a peak portion and a decay portion;

detecting, with a gated optical detecting means for detecting said reflected pulse, said rise portion, or said peak portion of said reflected pulse over a period of time no longer than the combined duration of said rise portion and said peak portion after a delay time corresponding to a shortest possible propagation time of said pulse of laser light traveling from a source to said object and reflected to said gated optical detecting means.

2. The method of claim 1, wherein said peak portion of reflected pulse has a width of about 400 picoseconds and is centered about a point at which said reflected pulse is at a maximum signal intensity.

3. The method of claim 1, wherein said laser pulse has a width of about 300 to about 500 picoseconds.

4. The method of claim 1, wherein said gated optical detecting means is gated to open for a period from about 100 to about 500 picoseconds.

5. The method of claim 1, wherein said gated optical detecting means is gated to open for a period from about 100 to about 300 picoseconds.

6. The method of claim 1, wherein said gated optical detecting means is gated to open for a period from about 100 to about 200 picoseconds.

7. The method of claim 1, wherein said gated optical detecting means is gated to open for a period from about 100 to about 150 picoseconds.

8. The method of claim 1, wherein said gated optical detecting means is gated to open for a period from about 100 to about 125 picoseconds.

9. The method of claim 1, wherein said turbid medium is turbid water.

10. The method of claim 9, wherein said laser pulse has a wavelength of 532 nanometers.

11. A device for detecting and imaging an object in a turbid medium which is at least partially transmitting to light comprising:

illuminating means for illuminating said object with a pulse of laser light having a pulse width of about 100 picoseconds to about 500 picoseconds whereby said object reflects said pulse of laser light, said reflected pulse having a rise portion, a peak portion and a decay portion; and detecting means for detecting said object with a gated optical detecting means for detecting said reflected pulse, said rise portion, or said peak portion of said reflected pulse over a period of time no longer than the combined duration of said rise portion and said peak portion after a delay time corresponding to a shortest possible propagation time of said pulse of laser light traveling from a source to said object and reflected to said gated optical detecting means.

* * * * *